United States Patent
Suilen et al.

(10) Patent No.: US 11,459,475 B2
(45) Date of Patent: Oct. 4, 2022

(54) RETARDATION OF PRIMER AND INK ABSORPTION TO POSTPONE COCKLING BY TEMPERATURE SWITCHABLE PRE-TREATMENT LIQUID

(71) Applicant: Canon Production Printing Holding B.V., Venlo (NL)

(72) Inventors: Frederik L. E. M. Suilen, Venlo (NL); Guido G. Willems, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 46 days.

(21) Appl. No.: 17/118,779

(22) Filed: Dec. 11, 2020

(65) Prior Publication Data
US 2021/0189166 A1 Jun. 24, 2021

(30) Foreign Application Priority Data
Dec. 20, 2019 (EP) .................................. 19218562

(51) Int. Cl.
*C09D 11/54* (2014.01)
*B41J 11/00* (2006.01)
*B41M 5/00* (2006.01)
*C09D 11/38* (2014.01)

(52) U.S. Cl.
CPC ............ *C09D 11/54* (2013.01); *B41J 11/002* (2013.01); *B41M 5/0023* (2013.01); *C09D 11/38* (2013.01)

(58) Field of Classification Search
CPC ....... C09D 11/38; C09D 11/40; C09D 11/322; C09D 11/34; C09D 11/54; B41M 3/001; B41M 5/0017; B41M 7/009
See application file for complete search history.

(56) References Cited

U.S. PATENT DOCUMENTS

| | | | | |
|---|---|---|---|---|
| 5,476,540 A * | 12/1995 | Shields | ................... | B41M 3/001 347/100 |
| 5,531,817 A * | 7/1996 | Shields | ................... | C09D 11/30 347/100 |
| 6,475,271 B2 * | 11/2002 | Lin | ........................ | C09D 11/30 106/31.86 |
| 6,872,243 B2 * | 3/2005 | Breton | ................... | C09D 11/34 106/31.77 |
| 7,004,579 B2 * | 2/2006 | Sato | ..................... | C09D 11/101 524/505 |
| 7,531,582 B2 * | 5/2009 | Toma | ..................... | C09D 11/34 347/100 |

(Continued)

FOREIGN PATENT DOCUMENTS

| | | |
|---|---|---|
| JP | 2012-111845 A | 6/2012 |
| WO | WO 2013/131924 A1 | 9/2013 |

(Continued)

OTHER PUBLICATIONS

European Search Report, issued in Application No. 19 21 8562, dated Jun. 12, 2020.

*Primary Examiner* — John Zimmermann
(74) *Attorney, Agent, or Firm* — Birch, Stewart, Kolasch & Birch, LLP

(57) ABSTRACT

A method of printing using a thermo reversible gelling primer composition, a thermo reversible gelling primer composition, and an ink set comprising the thermo reversible gelling primer composition.

20 Claims, 2 Drawing Sheets

(56) References Cited

U.S. PATENT DOCUMENTS

Figure 1:
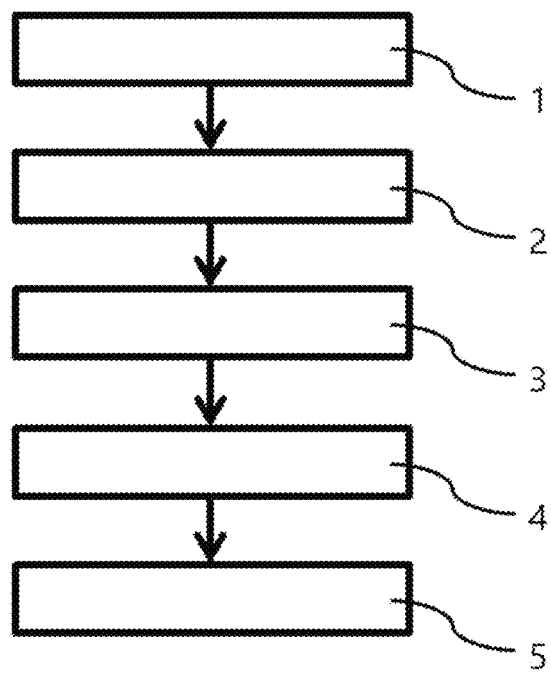

2011/0143047 A1* 6/2011 Kappaun ................ C09D 11/03
                                                          524/265
2011/0279514 A1   11/2011 Akiyama et al.
2016/0347963 A1* 12/2016 Suilen .................. C09D 11/322

FOREIGN PATENT DOCUMENTS

WO    WO 2015/114095 A1    8/2015
WO    WO 2019/126042 A1    6/2019

* cited by examiner

RETARDATION OF PRIMER AND INK ABSORPTION TO POSTPONE COCKLING BY TEMPERATURE SWITCHABLE PRE-TREATMENT LIQUID

FIELD OF THE INVENTION

The present invention relates to a method of printing using a thermo reversible gelling primer composition, a thermo reversible gelling primer composition, and an ink set comprising the thermo reversible gelling primer composition.

BACKGROUND ART

Cockling of a recording medium during or particularly after printing is a problem that is normally addressed by complicated printing mechanisms. For example, under pressure is used for printing on paper using printing belts. When releasing the under pressure from the printing belt after printing the, e.g. uncoated, papers that are usually wetted by water based solutions at coverages >2 g/m² the paper starts to cockle within 5 ms. To suck this cockle down on the fixation unit, usually high under pressures are needed. These high under pressures >2500 Pa are limiting the possibility of making a cheap, e.g. polymer-based, belt dryer. A solution is the use of rather expensive drum with high under pressure of 2500 to 3000 Pa to avoid this cockling problem.

A high under pressure on the suction box will usually lead to high friction between belt and suction box and will give excessive wear of the belt, and it is sometimes very difficult to move the belt over the suction box. The use of one belt in printing and fixation is a solution for this problem. As long as the under-pressure is not released, much lower pressures are needed to suppress cockling, e.g. around 500 Pa. In terms of energy consumption, however, this is not desirable due to warming up fixation part and cooling down the print belt part.

An alternative solutions to this problem, the lowering of the mol fraction of water, is described in US2011/0279514. Furthermore, WO2015/114095 discloses the use of a temperature switchable gelator in ink formulation. In WO2015/114095 A1 dye inks are made with gelling properties. However, both documents address inks, which make ink formulations more complicated.

It is therefore instead desirable to postpone the moment that the cockle appears.

SUMMARY OF THE INVENTION

The inventors found that by using temperature switchable primer, absorption can be retarded temporarily, so that cockling can be postponed or even avoided. Further, they found that by using the primer the print quality can be further controlled. Also, the switchable primer can serve as print quality improver, particularly for pigmented inks, in particular those containing particles.

A first aspect of the present invention relates to a method of printing, comprising:
providing a recording medium;
providing a thermo reversible gelling primer composition comprising a gelling agent;
applying the thermo reversible gelling primer composition onto the recording medium at a temperature $T_1$ below the gelling temperature $T_{gel}$ of the thermo reversible gelling primer composition, thereby forming a primer layer on the recording medium;
printing at least one ink on top of the primer layer, thereby forming an image; and
drying the image and the primer layer on top of the recording medium at a temperature $T_2$ above the gelling temperature $T_{gel}$ of the thermo reversible gelling primer composition, wherein the recording medium is a solvent-absorbing and/or a porous recording medium.

In a further aspect, the present invention relates to a thermo reversible gelling primer composition comprising a gelling agent and a destabilization agent, wherein the gelling agent is contained in the thermo reversible gelling primer composition in an amount between 0.1 and 6.0 wt. %, preferably between and including 0.15 and 5.0 wt. %, based on the thermo reversible gelling primer composition.

Additionally disclosed is an ink set, comprising the present thermo reversible gelling primer composition and at least one ink.

Further aspects and embodiments of the invention are dis-closed in the dependent claims and can be taken from the following description, figures and examples, without being limited thereto.

FIGURES

The enclosed drawings should illustrate embodiments of the present invention and convey a further understanding thereof. In connection with the description they serve as explanation of concepts and principles of the invention. Other embodiments and many of the stated advantages can be derived in relation to the drawings. The elements of the drawings are not necessarily to scale towards each other. Identical, functionally equivalent and acting equal features and components are denoted in the figures of the drawings with the same reference numbers, unless noted otherwise.

FIG. 1 shows schematically a method of the present invention.

Figure 2:
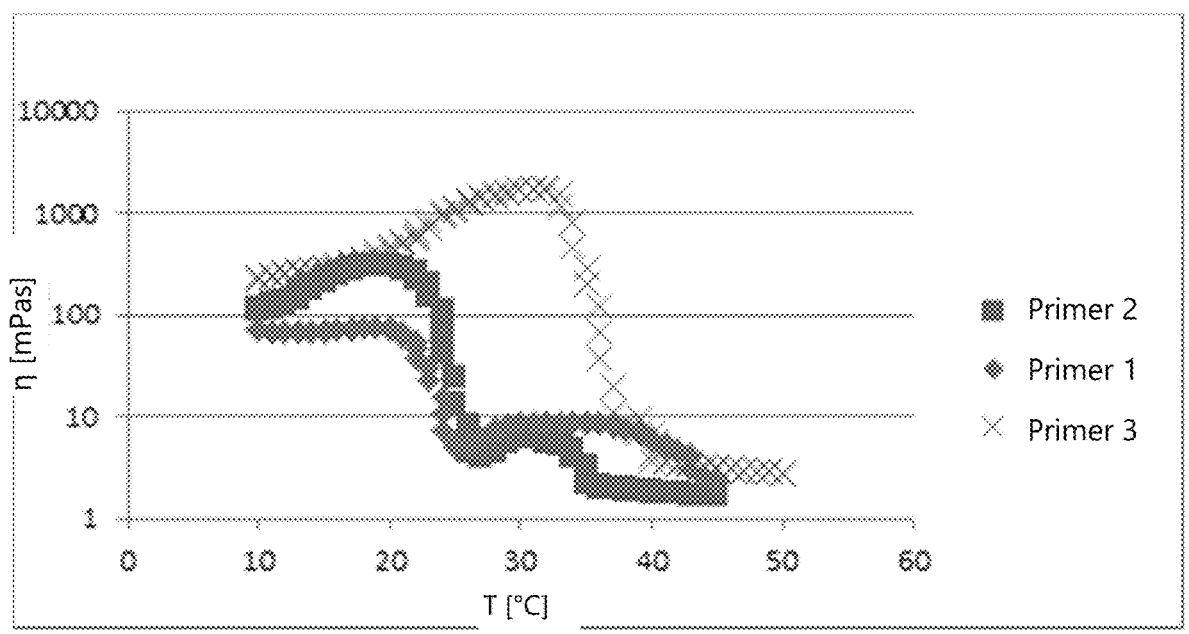
Figure 3:
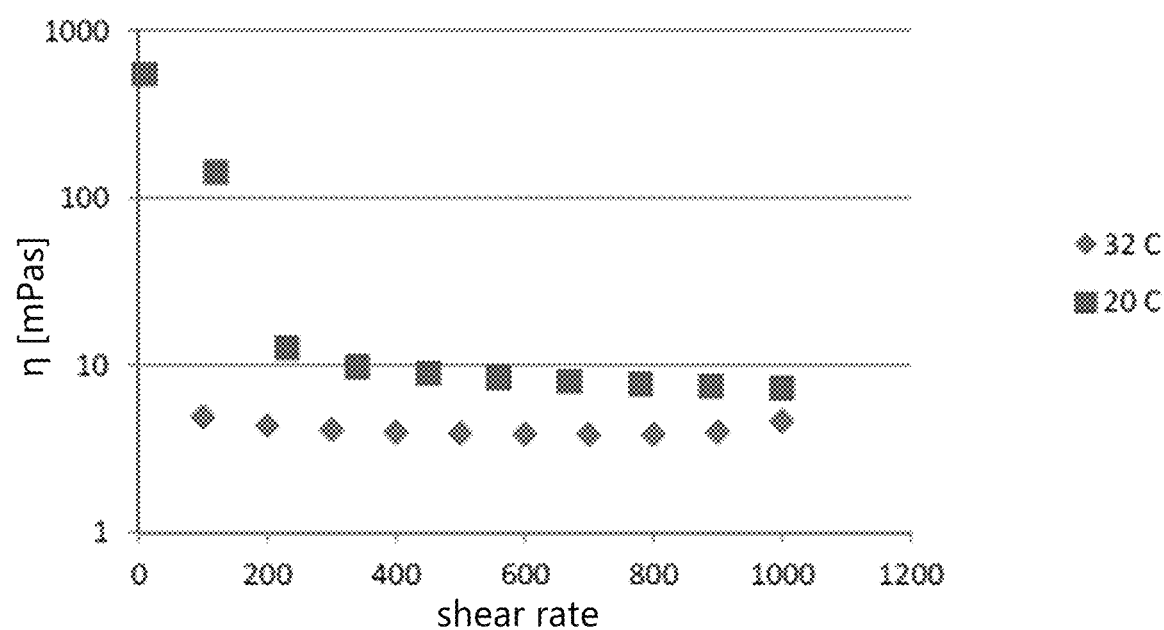

In FIGS. 2 and 3 data obtained in the present Examples are depicted.

DETAILED DESCRIPTION

Definitions

Unless defined otherwise, technical and scientific terms used herein have the same meaning as commonly understood by one of ordinary skill in the art to which this invention belongs.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination, and any combination of such claims is herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

Amounts within the present invention are given in wt. %, unless not stated otherwise or clear from context. In the present thermo reversible gelling primer composition amounts add up to 100 wt. %.

The gelling temperature is a temperature—or a temperature range in case the composition has a gelling temperature window, at which a gel is formed from a solution. In a thermo reversible gelling composition the composition is present as liquid, e.g. solution at higher temperatures, whereas it is present as gel film at lower temperatures, i.e. at or below the gelling temperature $T_{gel}$, particularly the highest temperature of the gelling temperature window if the gelling composition has such window. Gelling temperatures can be measured by determining the viscosity of the primer as a function of temperature. The temperature where a sharp change in viscosity is noted is the gelling temperature. In particular the viscosity increase of thermo reversible gelling primer composition according to the present invention with decreasing temperature is enhanced by a factor of 2 or more, preferably 3 or more, more preferably 5 or more, for example between 10 and 150 in a temperature window of between 1° C. and 50° C., preferably between 2° C. and 40° C., more preferably between 5° C. and 30° C., relative to the increase in viscosity of the basic primer composition, i.e. excluding the low molecular gelling agent. The gelling temperature window in the context of the present invention is defined as the width of a temperature range in which the viscosity of the thermo reversible gelling primer composition changes (i.e. increases with decreasing temperature). The viscosity $\eta$ can be e.g. measured using a Haake Rheometer, type Haake Rheostress RS 600, with a flat plate geometry, e.g. in a temperature range from 50° C. to 10° C., with e.g. a cooling rate of 2.33° C./min (35° C./900 sec). The viscosity can e.g. be measured at a shear rate of 70 $s^{-1}$.

A first aspect of the present invention relates to a method of printing, comprising:
  providing a recording medium;
  providing a thermo reversible gelling primer composition comprising a gelling agent;
  applying the thermo reversible gelling primer composition onto the recording medium at a temperature $T_1$ below the gelling temperature $T_{gel}$ of the thermo reversible gelling primer composition, thereby forming a primer layer on the recording medium;
  printing at least one, preferably water-based, ink on top of the primer layer, thereby forming an image; and
  drying the image and the primer layer on top of the recording medium at a temperature $T_2$ above the gelling temperature $T_{gel}$ of the thermo reversible gelling primer composition, wherein the recording medium is a solvent-absorbing and/or a porous recording medium, wherein the recording medium preferably comprises cellulose fibers.

The providing of the recording medium is not particularly restricted and can be done manually or automatically. It can be provided from the inside of a direct printing apparatus or from the outside.

The recording medium is not particularly restricted as long is it a solvent-absorbing and/or a porous recording medium, particularly a solvent-absorbing recording medium. The recording medium should have a certain porosity and/or absorptivity for a solvent, such that absorption of the combined primer and ink layer at a temperature above $T_{gel}$ is possible. Thus, particularly a balance between absorption and evaporation can be found for each combination of recording medium, primer and ink. Examples of the solvent-absorbing and/or porous recording medium are particularly cellulose-based materials, like paper, cardboard, etc., textiles, etc. A recording medium comprising cellulose fibers is particularly preferably, e.g. when using water-based inks in the present method.

Furthermore, the step of providing a thermo reversible gelling primer composition comprising a gelling agent is not particularly restricted, and it can be provided in any suitable way. According to certain embodiments the thermo-reversible gelling primer composition is provided in a liquid or at least non-gelled state for easy application, i.e. above the temperature $T_{gel}$, particularly above the highest temperature of a gelling temperature window the thermo reversible gelling primer composition might have, e.g. just above such temperature so that the gel can be easier formed when applying it to the recording medium.

According to certain embodiments, the thermo reversible gelling primer composition is provided at a temperature $T_4$ above the gelling temperature $T_{gel}$ of the thermo reversible gelling primer composition, particularly above the highest temperature of a gelling temperature window of the thermo reversible gelling primer composition. However, it is also possible to provide the thermo reversible gelling primer composition in a gelled stated or at least a viscous state at or just below the gelling temperature, e.g. at most 30, 20 or 10° C. below the gelling temperature $T_{gel}$, if it is still applicable, e.g. can be broken by shear forces and thus can be transported to an application unit and be applied.

According to certain embodiments, the thermo reversible gelling primer composition is stirred and or homogenized before or when providing it, and/or kept at an elevated temperature, e.g. above 25° C., e.g. above 30° C., to guarantee constant quality as a solution.

The thermo reversible gelling primer composition in the present method is not particularly restricted, as long as it comprise a gelling agent/gelation agent and can be suitably applied and thermo-reversibly form a gel. In the present thermo reversible gelling primer composition particularly no particles are present or needed and therefore it is suitable to use.

According to certain embodiments, the thermo-reversible gelling primer composition contains at least one gelling agent that thermo-reversibly forms a gel in a suitable solvent.

This gelling agent is not particularly restricted, and particularly gelling agents as used in printing inks can be applied. According to certain embodiments, the gelling agent is a low molecular weight gelling agent. Examples of such gelling agent comprise alkylamine oxides, in particular C14-C22 alkylamine oxides such as hexadecyl dimethyl amine oxide and octadecyl dimethyl amine oxide. Other examples of such gelling agents are distearyl methyl amine oxide, dihexadecyl methyl amine oxide, and stearyl amine oxide. According to certain embodiments, the thermo reversible gelling primer composition comprises at least one alkylamine oxide, preferably at least one trialkylamine oxide, e.g. octadecyl dimethyl amine oxide, as gelling agent.

The amount of the gelling agent in the thermo reversible gelling primer composition is not particularly restricted. According to certain embodiments, the amount of the gelling agent in the thermo reversible gelling primer composition is between 0.05 and 6.0 wt. %, e.g. between 0.08 and 5.5 wt. %, preferably between 0.1 and 5.2 wt. %, further preferably between and including 0.15 and 5.0 wt. %, e.g. between 0.16 and 4.0 wt. %, e.g. between 0.17 and 3.0 wt. %, e.g. between 0.18 and 2.0 wt. %, e.g. between 0.18 and 1.5 wt. %, based on the thermo reversible gelling primer composition.

Apart from that the thermo reversible gelling primer composition is not particularly restricted and can comprise components usually present in primer compositions for printing.

According to certain embodiments, the thermo reversible gelling primer composition comprises at least one solvent, which is not particularly restricted and can be water and/or an organic solvent, e.g. an organic solvent that can be absorbed by the recording medium, particularly water.

Also, one or more cosolvents can be used for good jettability. Cosolvents may have multiple functions, e.g. adapting the rheological behavior of the reaction liquid and/or preventing drying of the primer in the respective application, which drying may lead to precipitation of e.g. a salt contained in the primer. According to certain embodiments, the thermo reversible gelling primer composition comprises water as solvent and at least one co-solvent.

The cosolvent is not particularly restricted. Cosolvents similarly used in (aqueous) ink compositions may be suitably used. Examples of suitable cosolvents are water-soluble organic solvents such as polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of water-soluble organic solvents include (but are not limited to): glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylolpropane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol mono-ethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol monobutyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol monoethyl ether acetate, 1,2-hexanediol, 1,2-pentanediol and 1,2-butanediol.

The content of a cosolvent is not particularly restricted and can be as usual in pre-treatment liquids/primers. According to certain embodiments, at least one cosolvent is comprised in an amount of 1 wt. % to 70 wt. %, e.g. in an amount of 3 wt. % to 60 wt. %, e.g. in an amount of 5 wt. % to 50 wt. %, relative to the total content of the pre-treatment liquid.

According to certain embodiments, the thermo reversible gelling primer composition comprises at least one destabilization agent. The destabilization agent is not particularly restricted. According to certain embodiments, the at least one destabilization agent is an organic acid and/or an ionic compound, e.g. an organic acid. Examples of the organic acid include e.g. C1-C20 organic acids, C1-C20 dicarboxylic acids, further C1-C20 polycarboxylic acids, etc., e.g., formic acid, acetic acid, propionic acid, butyric acid, valeric acid, succinic acid, fumaric acid, malonic acid, maleic acid, etc. e.g. succinic acid. Also the ionic compound is not particularly restricted and can be e.g. a salt, e.g. containing a cation that is chosen from polyvalent metal ions like $Ca^{2+}$, $Mg^{2+}$, $Sr^{2+}$, $Zn^{2+}$, $Cu^{2+}$, $Ni^{2+}$, $Fe^{3+}$, $Cr^{3+}$ and/or $Al^{3+}$, e.g. an alkaline earth salt, e.g. a Ca and/or Mg salt. The counter ion in the salt is not particularly restricted and can be from a suitable inorganic or organic acid.

The amount of the destabilization agent is not particularly restricted, and it can be contained in an amount between and including 0 and 50 wt. %, e.g. between 0 and 20 wt. %, e.g. between 0.2 and 7 wt. %, e.g. between 0.5 and 5 wt. %, e.g. between 0.9 and 3.5 wt. %, e.g. between 1.2 and 2.7 wt. %

According to certain embodiments, the at least one water-based ink is destabilized by the destabilization agent. In this regard the ink can contain dispersed particles, like pigment particles and/or latex particles so that it can be destabilized. Normally these particles are charge stabilized, but will destabilize when brought in contact with e.g. acids and/or salts present in the pre-treatment liquid/primer. In this way pigments can be pinned, preventing feathering and intercolor bleeding, and film formation of the latex can be induced, improving print robustness. Using primer destabilization excessive absorption can be avoided and the print quality of the ink can be controlled.

In the present method the at least one ink is not particularly restricted, and one ink of more than one ink, as e.g. used in color printing, may be applied.

According to certain embodiments, the at least one ink is a water based ink. However, the at least one ink does not have to be a water based ink, as in general the gelled primer layer provides an absorption barrier for the ink composition, so that the drying and absorption of the ink can be balanced in order to optimize print quality. According to certain embodiments the ink and primer compositions are compatible, i.e. it should be possible to print an image on top of the gelled primer layer. Thus, it should be avoided that the ink contains components that can dissolve the gelled primer layer.

According to certain embodiments, the ink comprises dispersed particles. The dispersed particles may be colorant particles, in particular pigment particles, and/or latex particles. Examples of suitable inks are aqueous pigmented inks and latex inks, wherein the particles present in the ink (e.g. pigment particles and/or latex particles) are e.g. sensitive to reacting with organic acid and/or an ionic compound (e.g. a metal salt) present in the primer compositions according to the present invention. Such ink compositions are for example disclosed in the published International Patent Application WO2013/131924, in particular in the Examples and the cited prior art, which are hereby incorporated by reference.

The colorant particles may be a pigment or a mixture of pigments, a dye or a mixture of dyes or a mixture comprising pigments and dyes, as long as the colorant is water dispersed. Examples of the pigment usable in the present invention include those commonly known without any limitation, and either a water-dispersed pigment or an oildispersed pigment is usable. For example, an organic pigment such as an insoluble pigment or a lake pigment, as well as an inorganic pigment such as carbon black, is preferably usable. Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38. Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, 25 C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal based pigments (e.g., copper, iron (C.I. Pigment Black 11), and titanium oxide; and organic pigments (e.g., aniline black (C.I. Pigment Black 1).

The amount of the water-insoluble pigment contained in the inkjet ink, as a solid content, is preferably 0.5 weight % to 15 weight %, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink is increased, causing a degradation in ink ejection stability.

The ink may contain a water-dispersed resin (latex resin) in view of the pigment fixability to recording media. As the water-dispersed resin, a water-dispersed resin excellent in film formability (image formability) and having high water repellency, high waterfastness, and high weatherability is useful in recording images having high waterfastness and high image density (high color developing ability). Examples of the water-dispersed resin include synthetic resins and natural polymer compounds. Examples of the synthetic resins include polyester resins, polyurethane resins, polyepoxy resins, polyamide resins, polyether resins, poly(meth)acrylic resins, acrylsilicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid based resins, unsaturated carboxylic acid-based resins and copolymers such as styrene-acrylate copolymer resins, styrene-butadiene copolymer resins. Examples of the natural polymer compounds include celluloses, rosins, and natural rubbers.

In certain embodiments, the water dispersed resin used in the present invention may be made of a resin having a water soluble functional group such as a carboxylic group or a sulfonic group. In certain embodiments, the ink/ink composition comprises a resin having a carboxylic group which has a small dissociation rate from the viewpoint of producing high speed aggregation effect of the water-dispersed resin. Since a carboxylic acid group tends to be influenced by a pH change, a dispersion state changes easily and its aggregation property is high. Examples of resins suitable for use in ink compositions according to the present embodiment are: an acrylic resin, a vinyl acetate resin, a styrene butadiene resin, a vinyl chloride resin, an acrylic styrene resin, a butadiene resin and styrene resin. As for the resin component of the water-dispersed resin, it is preferable that it is a polymer having both a hydrophilic portion and a hydrophobic part in the molecule. By having a hydrophobic part, it is possible that a hydrophobic part will be orientated to the inside of the water-dispersed resin, and a hydrophilic portion will be effectively orientated to the outside of the water-dispersed resin. As a result, the change of a dispersion state in response to the pH change of a liquid will become larger, and aggregation of the ink will be performed more efficiently.

Examples of commercially available water-dispersed resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-633 NeoCryl A-1131, NeoCryl A-2091, NeoCryl A-550, NeoCryl BT-101, NeoCryl SR-270, NeoCryl XK-52, NeoCryl XK-39, NeoCryl XK-205, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-36, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95 However, the water-dispersed resin emulsion is not limited to these examples.

As the fluorine-based resin, fluorine-based resin fine particles having a fluoroolefin unit are preferred. Of these, fluorine-containing resin fine particles containing a fluoroolefin unit and a vinylether unit are particularly preferable. The fluoroolefin unit is not particularly limited and may be suitably selected in accordance with the intended use. Examples thereof include —CF2CF2-, —CF2CF(CF3)-, and —CF2CFCl-. The vinylether unit is not particularly limited and may be suitably selected in accordance with the intended use. Examples thereof include —C(Ra)HC(ORb)-; wherein Ra is a hydrogen atom or a methyl group; and wherein Rb may be selected from the group consisting of —CH2Rc, —C2H4Rc, —C3H6Rc, —C4H8Rc and —C5H10Rc, wherein Rc is selected from the group consisting of a hydrogen atom (—H), an hydroxy group (—OH) or a carboxylic acid group (—COOH).

As the fluorine-containing vinylether-based resin fine particles containing a fluoroolefin unit and a vinylether unit, an alternated copolymer, in which the fluoroolefin unit and the vinylether unit are alternately copolymerized, is preferable. As such a fluorine-based resin fine particles, a suitably synthesized compound may be used and a commercially available product may be used. Examples of the commercially available products include FLUONATE FEM-500 and FEM-600, DICGUARD F-52S, F-90, F-90M, F-90N and AQUAFURFURAN TE-5A produced by Dainippon Ink Chemical Industries Co., Ltd.; LUMIFLON FE4300, FE4500, FE4400, ASAHI GUARD AG-7105, AG-950, AG-7600, 25 AG-7000, and AG-1100 produced by Asahi Glass Co., Ltd.

The water-dispersed resin may be used in the form of a homopolymer, a copolymer or a composite resin, and all of water-dispersed resins having a monophase structure or core-shell structure and those prepared by power-feed emulsion polymerization may be used. As the water-dispersed resin, it is possible to use a resin which in itself has a hydrophilic group and hence has a certain degree of self-dispersibility, and a resin which in itself has no dispersibility but to which the dispersibility is imparted with use of a surfactant and/or another resin having a hydrophilic group. Among these resins, an emulsion of a resin obtained by emulsion polymerization or suspension polymerization of an ionomer of a polyester resin or a polyurethane resin is most suitably used. In the case of emulsion polymerization of an unsaturated monomer, a resin dispersion is obtained by initiating a polymerization reaction in the dispersed monomer phase in the monomer in water emulsion. A polymerization initiator, a surfactant, a chain transfer agent, a chelating agent and a pH adjustor may be added to the monomer in water emulsion.

Thus, a water-dispersed resin can be easily obtained, and the desired properties are easily obtained because the resin components can be varied. The content of the water-dispersed resin added in the ink of the present invention is preferably from 1-40 weight % based on the total weight of the ink, and it is more preferably from 1.5-30 weight %, and it is still more preferably from 2-25 weight %. Even more preferably, the amount of the water-dispersed resin contained in the ink, as a solid content, is 2.5 weight % to 15 weight %, and more preferably 3 weight % to 7 weight %, relative to the total ink composition.

Inks may comprise additives such as cosolvents and surfactants which are not limited to any kind and may be similar to the cosolvents and surfactants used in reaction liquids according to the present invention as described above.

In the present method furthermore the step of applying the thermo reversible gelling primer composition onto the recording medium at a temperature $T_1$ below the gelling temperature $T_{gel}$ of the thermo reversible gelling primer composition, thereby forming a primer layer on the recording medium is not particularly restricted. The thermo reversible gelling primer composition can be suitably applied on the recording medium using a suitable application unit, like a nozzle, jet, roll, etc., or multitudes and/or combinations thereof.

The gelling temperature can be determined by measuring the viscosity of the primer composition as a function of temperature. The temperature where a sharp change in viscosity is detected is termed the gelling temperature. In case of a more gradual viscosity change as a function of temperature, a gelling window is defined by a lower boundary temperature where the viscosity starts to decrease and an upper boundary temperature where the viscosity stabilizes to normal temperature dependent behavior. Measurement methods are described later on in the present application.

In the step of applying the thermo reversible gelling primer composition onto the recording medium the primer is applied onto the recording medium at a temperature $T_1$ below the gelling temperature $T_{gel}$, particularly the lowest gelling temperature in case the thermo reversible gelling primer composition has a gelling temperature window. For this purpose it is not excluded that the recording medium and/or the thermo reversible gelling primer composition are cooled during application.

The printing of the at least one, preferably water-based, ink on top of the primer layer, thereby forming an image, is also not particularly restricted, and it can be done via suitable printing units, e.g. print heads—as e.g. used in inkjet printing, nozzles, jets, rolls, etc.

According to certain embodiments, the printing of the at least one water-based ink on top of the primer layer is carried out at a temperature $T_3$ which does not heat the primer layer above the gelling temperature $T_{gel}$ of the thermo reversible gelling primer composition, particularly above the lowest temperature of a gelling temperature window if the primer has such a window. Preferably the printing of the at least one water-based ink on top of the primer layer is carried out at a temperature $T_3^*$ below the gelling temperature $T_{gel}$ of the thermo reversible gelling primer composition, particularly above the lowest temperature of a gelling temperature window if the primer has such a window.

The drying the image and the primer layer on top of the recording medium at a temperature $T_2$ above the gelling temperature $T_{gel}$ of the thermo reversible gelling primer composition, particularly above the highest temperature of a gelling temperature window if the primer shows such gelling temperature window, is not particularly restricted, and can be suitably carried out using e.g. a heater, e.g. before or during fixation. Drying can comprise the evaporation of solvents, in particular those solvents that have poor absorption characteristics with respect to the receiving medium.

It is not excluded that further steps usually carried out in printing are comprised in the present method.

A method of the present invention is shown schematically shown in FIG. 1. In step 1 a recording medium is provided, followed by a step 2 of providing a thermo reversible gelling primer composition comprising a gelling agent. Thereafter, in step 3 the thermo reversible gelling primer composition is applied onto the recording medium at a temperature $T_1$ below the gelling temperature $T_{gel}$ of the thermo reversible gelling primer composition, thereby forming a primer layer on the recording medium, followed by a step 4 of printing at least one, preferably water-based, ink on top of the primer layer, thereby forming an image, and a step 5 of drying the image and the primer layer on top of the recording medium at a temperature $T_2$ above the gelling temperature $T_{gel}$ of the thermo reversible gelling primer composition.

A further aspect of the present invention relates to a thermo reversible gelling primer composition comprising a gelling agent and a destabilization agent, wherein the gelling agent is contained in the thermo reversible gelling primer composition in an amount between 0.05 and 6.0 wt. %, based on the thermo reversible gelling primer composition.

The present thermo reversible gelling primer composition can be particularly used in the present method. Accordingly, descriptions and embodiments with regard to the method of the present invention are also applicable to the thermo reversible gelling primer composition and vice versa.

According to certain embodiments, the thermo-reversible gelling primer composition contains at least one gelling agent that thermo-reversibly forms a gel in a suitable solvent. This gelling agent is not particularly restricted, and particularly gelling agents as used in printing inks can be applied. According to certain embodiments, the gelling agent is a low molecular weight gelling agent. Examples of such gelling agent comprise alkylamine oxides, in particular C14-C22 alkylamine oxides such as hexadecyl dimethyl amine oxide and octadecyl dimethyl amine oxide. Other examples of such gelling agents are distearyl methyl amine oxide, dihexadecyl methyl amine oxide, and stearyl amine oxide. According to certain embodiments, the thermo reversible gelling primer composition comprises at least one alkylamine oxide, preferably at least one trialkylamine oxide, e.g. octadecyl dimethyl amine oxide, as gelling agent.

The amount of the gelling agent in the thermo reversible gelling primer composition is not particularly restricted. According to certain embodiments, the amount of the gelling agent in the thermo reversible gelling primer composition is between 0.08 and 5.5 wt. %, preferably between 0.1 and 5.2 wt. %, further preferably between and including 0.15 and 5.0 wt. %, e.g. between 0.16 and 4.0 wt. %, e.g. between 0.17 and 3.0 wt. %, e.g. between 0.18 and 2.0 wt. %, e.g. between 0.18 and 1.5 wt. %, based on the thermo reversible gelling primer composition.

Apart from that the thermo reversible gelling primer composition is not particularly restricted and can comprise components usually present in primer compositions for printing.

According to certain embodiments, the thermo reversible gelling primer composition comprises at least one solvent, which is not particularly restricted and can be water and/or an organic solvent, e.g. an organic solvent that can be absorbed by the recording medium, particularly water.

Also, one or more cosolvents can be used for good jettability. Cosolvents may have multiple functions, e.g. adapting the rheological behavior of the reaction liquid and/or preventing drying of the primer in the respective application, which drying may lead to precipitation of e.g. a salt contained in the primer. According to certain embodiments, the thermo reversible gelling primer composition comprises water as solvent and at least one co-solvent.

The cosolvent is not particularly restricted. Cosolvents similarly used in (aqueous) ink compositions may be suitably used. Examples of suitable cosolvents are water-soluble organic solvents such as polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of water-soluble organic solvents include (but are not limited to): glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylolpropane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol monobutyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol monoethyl ether acetate, 1,2-hexanediol, 1,2-pentanediol and 1,2-butanediol.

The content of a cosolvent is not particularly restricted and can be as usual in pre-treatment liquids/primers. According to certain embodiments, at least one cosolvent is comprised in an amount of 1 wt. % to 70 wt. %, e.g. in an amount of 3 wt. % to 60 wt. %, e.g. in an amount of 5 wt. % to 50 wt. %, relative to the total content of the pre-treatment liquid.

According to certain embodiments, the thermo reversible gelling primer composition comprises at least one destabilization agent. The destabilization agent is not particularly restricted. According to certain embodiments, the at least one destabilization agent is an organic acid and/or an ionic compound, e.g. an organic acid. Examples of the organic acid include e.g. C1-C20 organic acids, C1-C20 dicarboxylic acids, further C1-C20 polycarboxylic acids, etc., e.g., formic acid, acetic acid, propionic acid, butyric acid, valeric acid, succinic acid, fumaric acid, malonic acid, maleic acid, etc. e.g. succinic acid. Also the ionic compound is not particularly restricted and can be e.g. a salt, e.g. containing a cation that is chosen from polyvalent metal ions like $Ca^{2+}$, $Mg^{2+}$, $Sr^{2+}$, $Zn^{2+}$, $Cu^{2+}$, $Ni^{2+}$, $Fe^{3+}$, $Cr^{3+}$ and/or $Al^{3+}$, e.g. an alkaline earth salt, e.g. a Ca and/or Mg salt. The counter ion in the salt is not particularly restricted and can be from a suitable inorganic or organic acid.

The amount of the destabilization agent is not particularly restricted, and it can be contained in an amount between and including 0 and 50 wt. %, e.g. between 0 and 20 wt. %, e.g. between 0.2 and 7 wt. %, e.g. between 0.5 and 5 wt. %, e.g. between 0.9 and 3.5 wt. %, e.g. between 1.2 and 2.7 wt. %

Additionally disclosed is an ink set, comprising the present thermo reversible gelling primer composition and at least one ink. In the ink set, the thermo reversible gelling primer composition is the one described above with regard to the present method and the present thermo reversible gelling primer composition, and the at least one ink is not particularly restricted and can be one described with regard to the present method.

The above embodiments can be combined arbitrarily, if appropriate. Further possible embodiments and implementations of the invention comprise also combinations of features not explicitly mentioned in the foregoing or in the following with regard to the Examples of the invention. Particularly, a person skilled in the art will also add individual aspects as improvements or additions to the respective basic form of the invention.

Examples

The present invention will now be described in detail with reference to several examples thereof. However, these examples are illustrative and do not limit the scope of the invention.

Two exemplary thermo reversible gelling primer compositions were prepared by mixing the components given in Table 1.

TABLE 1

| Composition of primer / pretreatment liquid | | | |
|---|---|---|---|
| | Primer 1 (mass (g)) | Primer 2 (mass (g)) | Primer 3 (mass (g)) |
| Water | 50 | 50 | 50 |
| 2-pyrrolidone | 50 | 50 | 50 |
| Octadecyl dimethyl amine oxide | 0.2 | 0.6 | 5 |
| Succinic acid | 2 | 2 | 2 |

The succinic acid is used to destabilize a pigment in the ink used in the printing experiment described hereinafter. Octadecyl dimethyl amine oxide (odmao) is used as the gelling agent/gelating component.

For these compositions the viscosity was measured over a range from 10 to 50° C. The viscosity n was measured using a Haake Rheometer, type Haake Rheostress RS 600, with a flat plate geometry, in a temperature range from 50° C. to 10° C., with a cooling rate of 2.33° C./min (35° C./900 sec). The viscosity was measured at a shear rate of 70 $s^{-1}$.

The results of the measurements are shown in FIG. 2. It can be seen that the gelling is broken at 32° C., leading to a Newtonian liquid that is jettable. At 20° C. the viscosity is high. Also it can be seen that the amount of gelling agent has an effect on the viscosity jump and the temperature at which the viscosity jump occurs (e.g. compare primer 3 with primers 1 and 2).

The high viscosity can easily be broken by shear-forces, such that pumping the liquid to the print-head is still possible, as seen in FIG. 3. Heating up the supply can also help to lower the viscosity of the primer.

The primers were tested on uncoated untreated soporset paper. A rod coat of 4 g/m² primer and a rod coat of ink with 8 g/m² was coated. The composition of the ink applied is given in Table 2.

TABLE 2

| Composition of ink | |
|---|---|
| Component | Amount (wt. %) |
| water | balance |
| glycerol | 13 |
| Cosolvents | 4 |
| Additive | 0.02 |
| Surfactant | 3 |
| Polymer dispersion | 10 |
| Pigment | 4 |

Using the primers according to the invention the optical density (OD) of the print was greatly enhanced at places where the primer was applied, compared to places where the primer was not applied.

When using the present thermo-reversible gelling primer composition as a temperature switchable pre-treatment liquid the absorption of water in the recording medium can be retarded due to forming of a gel film as primer layer. In this way the cockle can be postponed because the amount of water going to the recording medium, e.g. cellulose fibres contained therein, is limited by the thermo-gel. When the recording medium, e.g. paper, is in a fixation unit, e.g. on a fixation belt, it is however desired that the viscosity is as low as possible to stimulate the absorption of solvents and/or co-solvents from the primer and/or the ink into the recording medium, e.g. paper. This is achieved with the present method. The temperature switch helps to reduce the viscosity as soon as the temperature rises and the gel network is broken.

The invention claimed is:

1. A method of printing, comprising:
   providing a recording medium;
   providing a thermo reversible gelling primer composition comprising a gelling agent;
   applying the thermo reversible gelling primer composition onto the recording medium at a temperature $T_1$ below the gelling temperature $T_{gel}$ of the thermo reversible gelling primer composition, thereby forming a primer layer on the recording medium;
   printing at least one ink on top of the primer layer, thereby forming an image; and
   drying the image and the primer layer on top of the recording medium at a temperature $T_2$ above the gelling temperature $T_{gel}$ of the thermo reversible gelling primer composition, wherein the recording medium is a solvent-absorbing and/or a porous recording medium.

2. The method of claim 1, wherein the thermo reversible gelling primer composition comprises at least one alkylamineoxide as gelling agent.

3. The method of claim 1, wherein the thermo reversible gelling primer composition comprises at least one destabilization agent.

4. The method of claim 3, wherein the at least one destabilization agent is an organic acid and/or an ionic compound.

5. The method of claim 1, wherein the thermo reversible gelling primer composition comprises water and at least one co-solvent.

6. The method of claim 1, wherein the amount of the gelling agent in the thermo reversible gelling primer composition is between 0.05 and 6.0 wt. %, based on the thermo reversible gelling primer composition.

7. The method of claim 3, wherein the at least one ink is destabilized by the destabilization agent.

8. The method of claim 1, wherein the printing of the at least one ink on top of the primer layer is carried out at a temperature $T_3$ which does not heat the primer layer above the gelling temperature $T_{gel}$ of the thermo reversible gelling primer composition.

9. The method of claim 1, wherein the thermo reversible gelling primer composition is provided at a temperature $T_4$ above the gelling temperature of the thermo reversible gelling primer composition.

10. A thermo reversible gelling primer composition comprising a gelling agent and a destabilization agent, wherein the gelling agent is contained in the thermo reversible gelling primer composition in an amount between 0.05 and 6.0 wt. %, based on the thermo reversible gelling primer composition.

11. The thermo reversible gelling primer composition of claim 10, comprising at least one alkylamineoxide as gelling agent.

12. The thermo reversible gelling primer composition of claim 10, wherein the at least one destabilization agent is an organic acid and/or an ionic compound.

13. The thermo reversible gelling primer composition of claim 10, further comprising water and at least one co-solvent.

14. An ink set, comprising the thermo reversible gelling primer composition of claim 10 and at least one ink.

15. The method of claim 1, wherein the at least one ink printed on top of the primer layer is a water-based ink.

16. The method of claim 1, wherein the recording medium comprises cellulose fibers.

17. The method of claim 1, wherein the thermo reversible gelling primer composition comprises at least one trialkylaminoxide as gelling agent.

18. The method of claim 1, wherein the printing of the at least one ink on top of the primer layer is carried out at a temperature $T_3^*$ below the gelling temperature $T_{gel}$ of the thermo reversible gelling primer composition.

19. The thermo reversible gelling primer composition of claim 10, comprising at least one trialkylaminoxide, as gelling agent.

20. The method of claim 2, wherein the thermo reversible gelling primer composition comprises at least one destabilization agent.

* * * * *